United States Patent
Travis

(10) Patent No.: US 6,883,919 B2
(45) Date of Patent: Apr. 26, 2005

(54) ACHROMATIC FLAT-PANEL DISPLAY

(75) Inventor: Adrian Robert Leigh Travis, Wrangaton (GB)

(73) Assignee: Cambridge Flat Projection Displays Limited, Fenstanton (GB)

( * ) Notice: Subject to any disclaimer, the term of this patent is extended or adjusted under 35 U.S.C. 154(b) by 243 days.

(21) Appl. No.: 10/432,130

(22) PCT Filed: Nov. 26, 2001

(86) PCT No.: PCT/GB01/05211

§ 371 (c)(1),
(2), (4) Date: Oct. 24, 2003

(87) PCT Pub. No.: WO02/43381

PCT Pub. Date: May 30, 2002

(65) Prior Publication Data

US 2004/0070737 A1 Apr. 15, 2004

(30) Foreign Application Priority Data

Nov. 25, 2000 (GB) .............................................. 0028800

(51) Int. Cl.[7] .............................................. G03B 21/14
(52) U.S. Cl. ........................... 353/81; 353/69; 385/901; 359/443
(58) Field of Search .............................. 353/22, 38, 69, 353/79, 81, 122; 385/901; 359/443, 453

(56) References Cited

U.S. PATENT DOCUMENTS

| | | | | |
|---|---|---|---|---|
| 5,046,805 A | * | 9/1991 | Simon | 385/31 |
| 5,381,502 A | * | 1/1995 | Veligdan | 385/115 |
| 5,625,736 A | * | 4/1997 | Veligdan | 385/120 |
| 5,745,266 A | * | 4/1998 | Smith | 359/34 |
| 6,002,826 A | * | 12/1999 | Veligdan | 385/120 |
| 6,012,816 A | * | 1/2000 | Beiser | 353/122 |
| 6,222,971 B1 | * | 4/2001 | Veligdan et al. | 385/120 |
| 6,406,150 B1 | * | 6/2002 | Burstyn | 353/69 |

FOREIGN PATENT DOCUMENTS

WO          WO9815128         *   4/1998

* cited by examiner

*Primary Examiner*—William C. Dowling
(74) *Attorney, Agent, or Firm*—Garvey, Smith, Nehrbass & Doody, L.L.C.; Gregory C. Smith; Brett A. North

(57) ABSTRACT

An achromatic flat-panel projection display comprises a video projector 2a, a condensing lens (26) and a tapered transparent slab spreading the image input from the projector over the area of th slab. To compensate for dispersion in the slab a dispersive prism is used at the input edge of the slab, whose dispersion cancels out the dispersion of the slab. The prism can be a separate part of simply a bevel in the input edge, i.e. the thick end of the slab.

5 Claims, 2 Drawing Sheets

ACHROMATIC FLAT-PANEL DISPLAY

This invention is concerned with a way of correcting chromatic aberration in a flat-panel display, in particular of the type in which the image is projected from a microdisplay into a tapered transparent slab.

Displays which have screens large enough to stimulate the quick reactions of our peripheral vision give pictures great immediacy, and it is desirable for them to be flat so that the displays will fit easily onto the wall of a room. The size of conventional flat-panel displays however is limited by the resistor/capacitor time constant of the row and column transparent conductors, and by the area over which lithography can be sufficiently precise to make transistors. The cost of making active-matrix liquid-crystal displays with screen diagonals greater than one meter is prohibitive, and even the cheaper plasma displays are too expensive for most uses, but costs decrease considerably with size and the 2" by 2" liquid-crystal displays used in video projectors are relatively cheap, while fingernail-sized microdisplays look set to cost only a few dollars.

Video projectors comprise a two-dimensional display, a projection lens and a translucent screen, and the projection lens forms on the translucent screen a magnified image of the two-dimensional display which can be almost as big as one wants. Video projectors are cheap, so are becoming increasingly popular, but have drawbacks. In the type in which the projector is pointed at the front of the translucent screen, often the projector gets in the way of the viewer, or the viewer gets in the way of the projected light. Furthermore, unless the room lights are dimmed, the image looks washed out because the screen scatters background light as well as the projected image. The projector can instead be pointed at the rear of the screen so that there is nothing between the viewer and the screen, and the screen made to scatter only light incident on its rear, but rear-projection displays are bulky.

Recently there was disclosed in the applicants' WO 01/72037 a tapered display which comprises a video projector and a tapered sheet of glass. The video projector itself comprises a source of approximately collimated illumination, a microdisplay, a condensing lens and a projection lens, and as the rays leave the projection lens they form a narrow waist. At this point the rays are passed into the thick end of the tapered sheet or slab of glass. When a ray is shone into the thick end of a sheet of glass which tapers, then the out-of-plane angle measured with respect to one face of the taper will change each time the ray reflects within the sheet off the opposite face of the taper. Eventually the ray propagates far enough along the taper that the out-of-plane angle becomes greater than the critical angle, and at this point light escapes the taper. The distance into the tapered sheet of glass at which the ray leaves the taper is therefore determined by the angle at which the ray is injected. In this way the 2D array of pixels on the microdisplay is mapped one-to-one to a 2D array of pixels on the face of the tapered waveguide. An anti-reflection coating is needed to ensure that all the light leaves the screen when the ray reaches the critical angle, otherwise there is blurring between adjacent rows of the image.

The tapered display can be made flat while still sharing many of the advantages of a rear-screen projection display, but the slab will typically be made of a material which leads to optical dispersion. This causes the projected image to have chromatic aberration.

According to the present invention there is provided an achromatic flat-panel projection display comprising a video projector projecting an image through a condensing lens into the thick end of a tapered transparent slab over one face of which the image emerges, and a dispersive prism between the projector and the slab, compensating for the dispersion in the slab.

The prism can be made of the same material as the slab and can extend over the width of the slab, perhaps being integral with the slab or even with the condensing lens. It may typically have a prism angle of about 45°.

For a better understanding of the invention embodiments of it will now be described, by way of example, with reference to the accompanying drawings, in which.

Figure 1:
FIG. 1 illustrates how the distance which a ray of light propagates along a tapered transparent slab is determined by the angle at which the ray is injected.

FIG. 1 shows the general principle of the flat-panel tapered waveguide display. Light from a video projector is injected into the thick end of a transparent tapered slab 1. Light from each pixel row enters at a slightly different angle, as exemplified by the two rays shown.

As the rays bounce off the opposed tapered faces of the slab their angle of incidence becomes ever steeper until they leave the slab at a point (or line) corresponding to their angle of injection, which in turn corresponds to their row location in the original image. The emerging rays are very shallow, but they can be brought nearer perpendicular and spread in azimuth for viewing purposes by known means, as described in WO 01/72037. Normally the image would be expanded laterally (perpendicular to the paper) so that the image is as wide as the slab.

The slab 1 introduces chromatic aberration. The aberration caused by the optical dispersion of the tapered slab 1 has two components. Firstly, rays of different wavelength will have different critical angles so even if the rays share the same initial angle within the tapered slab 1, they will emerge at different points. Secondly rays with the same angle before injection into the slab 1 but different wavelengths will have different angles after injection into the slab 1.

This invention discloses how a dispersive prism or a bevel at the entrance to the tapered slab 1 can be added so that the two effects will cancel one another out, and shows how to calculate the correct angle for the prism or bevel.

Figure 2:
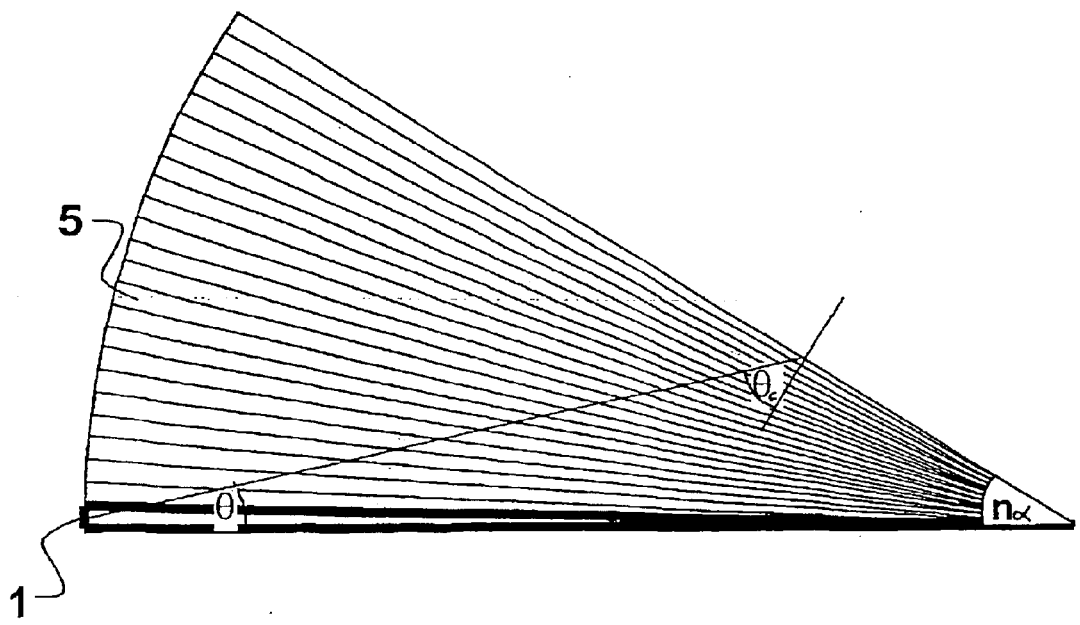
FIG. 2 illustrates how the passage of a ray through the tapered slab can be found by tracing a straight ray through mirror images of the tapered slab.
Figure 3:
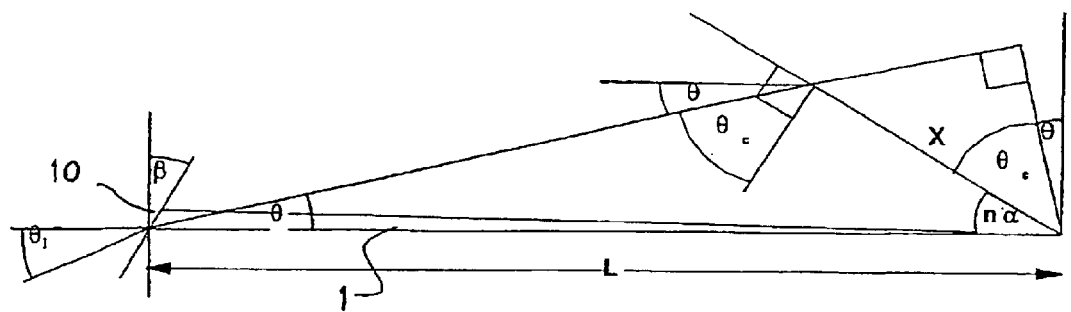
FIG. 3 illustrates the trigonometry of FIG. 2.

In order to trace rays through the tapered slab 1, it is helpful to think of tracing a straight ray through a stack of wedges 5, which is optically equivalent to FIG. 2. When the ray hits an interface at the critical angle $\theta_c$ it emerges, and the distance from the tip of the tapered slab 1 at which the ray emerges can be related to the angle at which the ray was injected using the geometry in FIG. 3.

This shows that:

$$\frac{X \cos\theta_c}{L} = \sin\theta$$

where $\theta$ is the out-of-plane angle of propagation within the waveguide. Now the critical angle is defined by:

$$\sin\theta_c = \frac{1}{n} \text{ so } \cos\theta_c = \sqrt{1 - \frac{1}{n^2}} \text{ and } \frac{X}{L} = \frac{n}{\sqrt{n^2-1}}\sin\theta$$

Now at the point of injection the light enters at an angle which shall be called $\theta_1$ from air (refractive index=1) to glass (refractive index=n) and if the edge of the wedge is bevelled at an angle $\beta$, as shown by the numeral 10, then Snell's law gives:

$$\sin(\theta_1+\beta) = n\sin(\theta+\beta)$$

We can rewrite $\sin\theta$ as:

$$\sin\theta = \sin[(\theta+\beta)-\beta]$$

which, using standard trigonometric manipulation, gives:

$$\sin\theta = \sin(\theta+\beta)\cos\beta - \cos(\theta+\beta)\sin\theta$$

so using Snell's law:

$$\sin\theta = \frac{1}{n}\sin(\theta_1+\beta)\cos\beta - \sqrt{1-\frac{1}{n^2}\sin^2(\theta_1+\beta)}\sin\beta$$

hence:
$$\frac{X}{L} = \frac{\sin(\theta_1+\beta)\cos\beta - \sqrt{n^2-\sin^2(\theta_1+\beta)}\sin\beta}{\sqrt{n^2-1}}$$

Most materials are dispersive, so the variation, $\delta n$, in refractive-index around some average $n_0$ due to changes in wavelength causes a variation, $\delta X$, in the distance from the tip of the wedge at which a ray emerges about some central point X. According to Taylor's theorem, $\delta X$ is given by:

$$\frac{\delta X}{L} \approx \delta n \frac{d(X/L)}{dn}$$

Now we require that $\delta X$ equals zero and:

$$\frac{d(X/L)}{dn} = -n_0 \frac{\sin(\theta_1+\beta)\cos\beta - \sqrt{n_0^2-\sin^2(\theta_1+\beta)}\sin\beta}{(n_0^2-1)^{3/2}} -$$

$$n_0 \frac{(n_0^2-\sin^2(\theta_1+\beta))^{-1/2}\sin\beta}{\sqrt{n_0^2-1}}$$

so: $$\frac{\sin(\theta_1+\beta)\cos\beta - \sqrt{n_0^2-\sin^2(\theta_1+\beta)}\sin\beta}{n_0^2-1} =$$

$$-(n_0^2-\sin^2(\theta_1+\beta))^{-1/2}\sin\beta$$

and rearranging:

$$\frac{\sin(\theta_1+\beta)}{\tan\beta} = \sqrt{n_0^2-\sin^2(\theta_1+\beta)} - \frac{(n_0^2-1)}{\sqrt{n_0^2-\sin^2(\theta_1+\beta)}}$$

This gives a quadratic which can be solved either algebraically or numerically in such a way as to find what value of $\beta$ gives zero $\delta X$ for a particular $\theta_1$. For example, if $n_0=1.5$ and $\theta_1=13.7°$, which is an angle which will typically produce a ray half-way up the screen of the tapered slab 1, then $\beta=-45°$.

The achromatic correction can be effected either by polishing the thick end of the tapered slab 1 at an angle of $\beta=-45°$, or by leaving it square and inserting a 45° prism 3 with the same optical dispersion as the tapered slab 1, for instance being made of the same material, or by some combination of the two. A prism with a different optical dispersion, or a grating or some other kind of dispersive element, may also be used to correct the chromatic aberration, and the dimensions of the element can be found by a similar manner to that elaborated above.

If second-order chromatic correction is required, then the double differential of (X/L) with respect to n must also be made equal to zero, and this can be done by inserting a pair of dispersive components with independent effects on X/L, such as a diffraction grating and a prism, with dimensions calculated in a similar way to that shown above.

Figure 4:
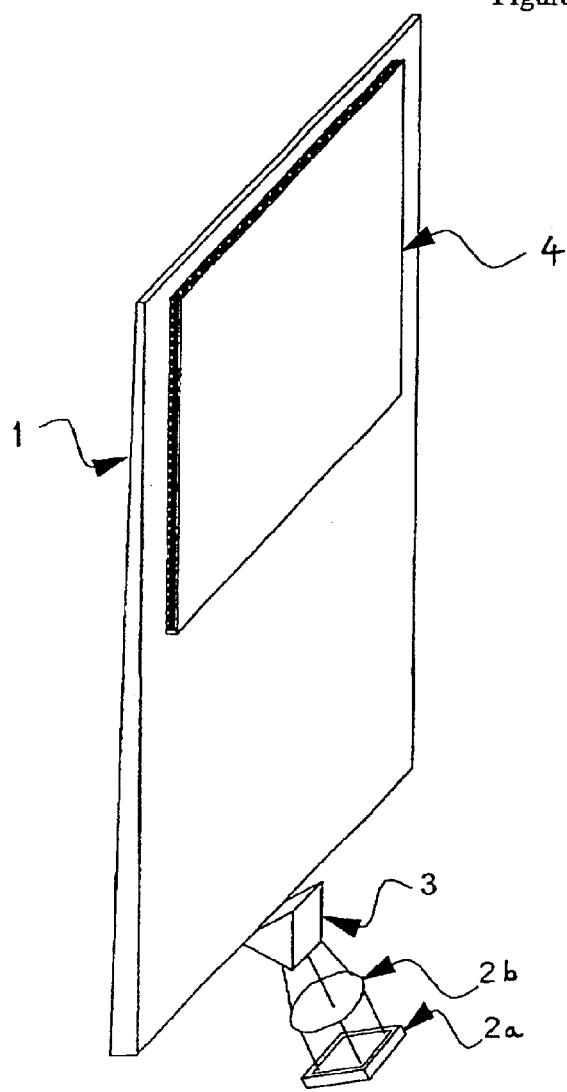
FIG. 4 illustrates an achromatic flat-panel projection display embodying the invention.

An achromatic flat-panel projection display according to the present invention is shown in FIG. 4 and comprises a video projector 2a, a condensing lens 2b, a tapered transparent slab 1, a diffusive screen 4 for making the image visible by spreading the rays as they emerge from the slab, and a dispersive prism 3, the dimensions of the prism 3 being determined by the description provided above. If a flat slab is used as an input waveguide to magnify the image laterally before the rays enter the tapered waveguide then the prism can be either before or after the input waveguide.

What is claimed is:

1. An achromatic flat-panel projection display comprising an image projector for projecting an image to be displayed, and a tapered transparent slab into the thick end of which the image is projected so that the rays emerge over one face of the slab, the slab being made of a dispersive material; further comprising a dispersive prism between the projector and the slab, compensating for the dispersion occurring in the slab.

2. A display according to claim 1, in which the prism is a separate component.

3. A display according to claim 2, in which the prism is made of the same material as the slab.

4. A display according to claim 1, in which the prism is integral with the slab so that the input edge is bevelled.

5. A display according to claim 1, in which the angle $\beta$ of the prism satisfies $$\frac{\sin(\theta_1+\beta)}{\tan\beta} = \sqrt{n_0^2-\sin^2(\theta_1+\beta)} - \frac{(n_0^2-1)}{\sqrt{n_0^2-\sin^2(\theta_1+\beta)}}$$

where $\theta_1$ is the angle of input in air relative to the plane of the slab, and $n_0$ is the average refractive index of the material of the slab over the range of wavelengths input from the projector.

* * * * *